United States Patent
Cho

(10) Patent No.: US 8,804,224 B2
(45) Date of Patent: Aug. 12, 2014

(54) LENS WITH LOW BIREFRINGENCE, METHOD OF FABRICATING THE LENS, AND LIGHT SCANNING UNIT INCLUDING THE LENS

(75) Inventor: Won-young Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/267,072

(22) Filed: Oct. 6, 2011

(65) Prior Publication Data

US 2012/0154883 A1    Jun. 21, 2012

(30) Foreign Application Priority Data

Dec. 21, 2010    (KR) .................. 10-2010-0131662

(51) Int. Cl.
*G02B 26/08*    (2006.01)
*B41J 27/00*    (2006.01)

(52) U.S. Cl.
USPC ............... 359/201.1; 359/209.1; 359/210.2; 359/196.1; 359/197.1; 347/258

(58) Field of Classification Search
USPC .......... 359/201.1, 196.1–197.1, 209.1–210.2; 347/258, 244
See application file for complete search history.

(56) References Cited

U.S. PATENT DOCUMENTS

| | | |
|---|---|---|
| 6,262,214 B1 * | 7/2001 | Yanagase et al. .......... 526/329.6 |
| 2003/0076769 A1 * | 4/2003 | Kim et al. ................ 369/112.26 |
| 2003/0112531 A1 | 6/2003 | Kuroda et al. |
| 2005/0270365 A1 * | 12/2005 | Yoshida ........................ 347/243 |

* cited by examiner

*Primary Examiner* — Sarah Al Hashimi
(74) *Attorney, Agent, or Firm* — Stanzione & Kim, LLP

(57) ABSTRACT

There are provided a lens, a method of fabricating the lens, and a light scanning unit. The lens includes a lens portion having an effective optical surface, and a gate-side flange portion between the lens portion and a gate-side end of the lens. If the lens is disposed between two polarizers configured to polarize light linearly in perpendicular directions and is illuminated in an optical axis direction, interference fringes are generated on the lens, and peripheral interference fringes of the interference fringes extend continuously from the gate-side end and are longer than the gate-side flange portion.

19 Claims, 10 Drawing Sheets

LENS WITH LOW BIREFRINGENCE, METHOD OF FABRICATING THE LENS, AND LIGHT SCANNING UNIT INCLUDING THE LENS

CROSS-REFERENCE TO RELATED APPLICATIONS

This application claims priority under 35 U.S.C. §119 from Korean Patent Application No. 10-2010-0131662, filed on Dec. 21, 2010, in the Korean Intellectual Property Office, the disclosure of which is incorporated herein in its entirety by reference.

BACKGROUND OF THE INVENTION

1. Field of the Invention

The present general inventive concept relates to a lens, a method of fabricating the lens, and a light scanning unit including the lens, and more particularly, to a lens with low birefringence, a method of fabricating the lens, and a light scanning unit including the lens.

2. Description of the Related Art

Light scanning units are used to scan a predetermined region with light emitted from a light source. Light scanning units are used in various fields. For example, light scanning units are used in scanning type displays and electrophotographic image forming apparatuses such as printers, digital copy machines, and fax machines. In an image forming apparatus, a light beam is emitted from a light scanning unit to a photoconductor such as a photoconductive drum in a main scanning direction by an operation of the light scanning unit and in a sub scanning direction by a movement of the photoconductor, so as to form an electrostatic latent image on the photoconductor. The electrostatic latent image is developed by a developer such as toner, and the developed image is transferred to a printing medium.

The light scanning unit includes a deflector to deflect a light beam emitted from a light source to the photoconductor, and optical devices (lenses) to refract and image the light beam emitted from the light source. Examples of the optical devices are a collimator lens configured to collimate a light beam emitted from a light source, a cylindrical lens configured to condense a light beam onto a reflection surface of a deflector, a synchronization detection lens used to check synchronization of a light beam, and a scanning lens configured to image a light beam deflected from a deflector onto a photoconductor.

Such optical devices of the light scanning unit are usually fabricated through an injection molding process. In this case, however, birefringence is observed in the optical devices due to flow and shrinkage of a resin during the injection molding process. Such birefringence increases aberrations of lenses and increases spot sizes of the lenses, thereby lowering image quality.

SUMMARY OF THE INVENTION

The present general inventive concept provides a lens causing low birefringence, a method of fabricating the lens, and a light scanning unit including the lens.

Additional features and utilities and advantages of the present general inventive concept will be set forth in part in the description which follows and, in part, will be obvious from the description, or may be learned by practice of the present general inventive concept.

According to features and utilities of the present general inventive concept, there is provided a lens including: a lens portion including an effective optical surface, and a gate-side flange portion between the lens portion and a gate-side end of the lens, wherein the lens has a structure to generate interference fringes on the lens if the lens is disposed between two polarizers configured to polarize light linearly in perpendicular directions and is illuminated in an optical axis direction, and peripheral interference fringes of the interference fringes extend continuously from the gate-side end and are longer than the gate-side flange portion.

The lens may extend in a main scanning direction such that a light beam deflected by a deflector in the main scanning direction is imaged on a scanned surface through the lens.

When the lens disposed between the two polarizers is rotated with respect to an optical axis by a rotation angle θ, one of the peripheral interference fringes located above a sub-scanning centerline may be darkened for the rotation angle θ in a range of $0°<θ<45°$. Darkening of the peripheral interference fringe located above the sub-scanning centerline and darkening of one of the peripheral interference fringes located below the sub-scanning centerline are varied according to rotation of the lens in different rotation directions with respect to the optical axis.

The peripheral interference fringes extending continuously from the gate-side end may not reach the effective optical surface of the lens portion.

A thickness of the lens portion in the optical axis direction may be maximal at a center part of the lens portion. A maximal thickness of the lens portion in the optical axis direction may be greater than 6 mm.

The lens may be formed of a plastic resin.

According to other features and utilities of the present general inventive concept, there is provided a method of fabricating the lens through an injection molding process, the method including: filling a melted resin into a cavity of an injection mold through a gate, performing a first packing operation by continuously injecting the resin into the cavity so as to compensate for shrinkage of the resin cooled in the cavity after the filling the resin, after a surface of the resin is solidified in the cavity, performing a second packing operation by reducing a holding pressure so as to allow a part of the resin that is not solidified to backflow from the cavity to the gate, and before the gate is sealed, performing a third packing operation by re-injecting the resin into the cavity so as to compensate for shrinkage of the resin cooled in the cavity.

Start times and holding pressures of the second and third packing operations may be set such that the peripheral interference fringes continuously extending from the gate-side end are longer than the gate-side flange portion.

The start times and holding pressures of the second and third packing operations may be set such that the peripheral interference fringes extending continuously from the gate-side end do not reach the effective optical surface.

According to other features and utilities of the present general inventive concept, there is provided a light scanning unit including: a light source configured to emit a light beam, a deflector configured to deflect the light beam emitted from the light source in a main scanning direction, and a least one lens disposed between the light source and the deflector or between the deflector and a scanned surface. The lens includes: a lens portion including an effective optical surface, and a gate-side flange portion between the lens portion and a gate-side end of the lens, wherein the lens has a structure to generate interference fringes on the lens if the lens is disposed between two polarizers configured to polarize light linearly in perpendicular directions and is illuminated in an optical axis direction, and peripheral interference fringes of the interference fringes extend continuously from the gate-side end and are longer than the gate-side flange portion. The lens may be included in an imaging optical system configured to image a light beam deflected by the deflector to the scanned surface.

According to other features and utilities of the present general inventive concept, there is provided an image forming apparatus including: a light scanning unit, a developing unit including a photoconductor disposed at a position on which the light beam emitted from the light scanning unit is imaged so that an electrostatic latent image is formed on the photoconductor, and a developer roller configured to develop the electrostatic latent image, and a transfer unit to which the image developed by the developing unit is transferred. The light scanning unit includes: a light source configured to emit a light beam, a deflector configured to deflect the light beam emitted from the light source in a main scanning direction, and a least one lens disposed between the light source and the deflector or between the deflector and a scanned surface. The lens includes: a lens portion including an effective optical surface, and a gate-side flange portion between the lens portion and a gate-side end of the lens, wherein the lens has a structure to generate interference fringes on the lens if the lens is disposed between two polarizers configured to polarize light linearly in perpendicular directions and is illuminated in an optical axis direction, and peripheral interference fringes of the interference fringes extend continuously from the gate-side end and are longer than the gate-side flange portion.

According to other features and utilities of the present general inventive concept, there is provided a lens having an elongated shape, the lens including a lens portion including an effective optical surface, and first and second flange portions disposed at opposite ends of the lens portion in a length direction of the lens, wherein the lens has a structure to generate interference fringes disposed within the lens portion and peripheral interference fringes disposed within the first flange portion when the lens is illuminated in an optical axis direction by a polarized light.

The interference fringes and the peripheral interference fringes extend in the length direction of the lens.

The first flange portion is a gate-side flange portion having a gate-side end.

The lens is an injection-molded lens formed by injecting lens material from the gate-side end.

The interference fringes and the peripheral interference fringes are detected by an interference fringe detector providing the polarized light, the interference fringe detector including a light source to provide light, a first polarizer to polarize the light from the light source in a first direction, a second polarizer to polarize the light polarized by the first polarizer in a second direction perpendicular to the first direction, and a camera to detect the interference fringes and the peripheral interference fringes. The interference fringe detector is configured to hold the lens between the first polarizer and the second polarizer.

According to other features and utilities of the present general inventive concept, there is provided a method of fabricating a lens via an injection mold including a cavity having a shape of the lens and a gate disposed at one end of the cavity in a length direction of the cavity, the method including performing a filling operation by filling a melted resin into the cavity of the injection mold through the gate, performing a plurality of packing operations by injecting the resin into the cavity at different holding pressures, and sealing the gate with the resin.

The performing of the plurality of packing operations may include performing a first packing operation by injecting the resin into the cavity at a first holding pressure after at least some of the resin filled in the cavity during the filling operation cools, performing a second packing operation by injecting the resin into the cavity at a second holding pressure after at least some of the resin injected during the first packing operation cools, and performing a third packing operation by injecting the resin into the cavity at a third holding pressure after at least some of the resin injected during the second packing operation cools.

The second holding pressure may be less than the first holding pressure.

The third holding pressure may be less than the second holding pressure.

A duration of the first operation may be shorter than a duration of the second operation A duration of the second operation may be shorter than a duration of the third operation.

The second holding pressure may be smaller than a friction force applied to the resin in the cavity during the injection of the second packing operation.

At least some of the resin may be discharged from the cavity through the gate during the second packing operation.

According to other features and utilities of the present general inventive concept, there is provided an image forming apparatus including a light source to emit light, a photoconductor onto which the light from the light source is scanned, and a lens between the light source and the photoconductor, the lens having a lens portion to direct the light from the light source onto the photoconductor and a flange portion at one side of the lens portion, wherein the lens has a structure to generate interference fringes within the lens portion and peripheral interference fringes in the flange portion extending into the lens portion when the lens is illuminated in an optical axis direction by a polarized light According to a method of fabricating a lens according to the present general inventive concept, a lens causing less birefringence can be fabricated through a conventional injection molding process, and thus spot size errors of the image forming apparatus caused by birefringence can be reduced.

BRIEF DESCRIPTION OF THE DRAWINGS

The above and other features and advantages of the present general inventive concept will become more apparent and more readily appreciated from the following description of the embodiments with reference to the accompanying drawings in which.

DETAILED DESCRIPTION OF THE PREFERRED EMBODIMENTS

Figure 1:
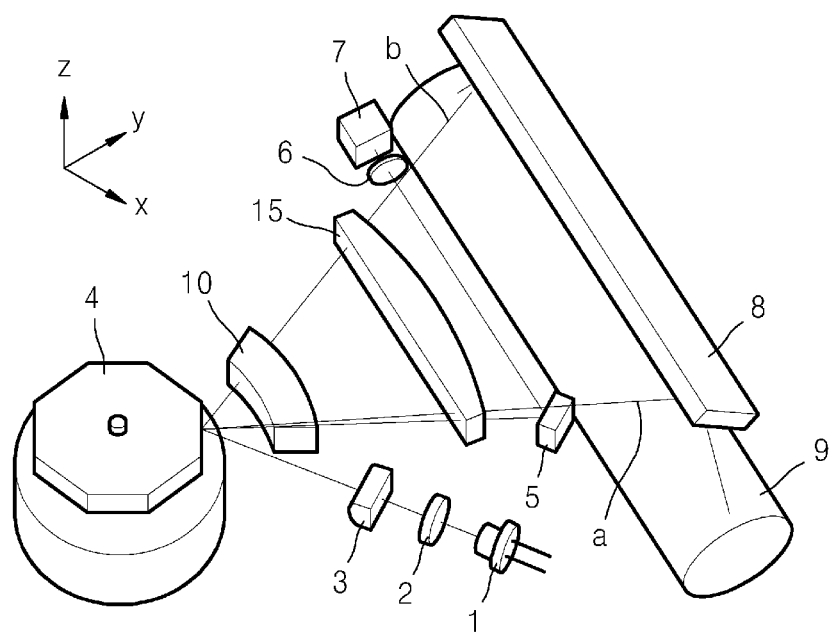
FIG. 1 is a schematic view illustrating a light scanning unit according to an embodiment of the present general inventive concept.

The present general inventive concept will now be described more fully with reference to the accompanying drawings, in which exemplary embodiments of the invention are shown. In the drawings, like reference numerals denote like elements throughout, and the sizes or thicknesses of elements may be exaggerated for clarity. The embodiments are described below in order to explain the present general inventive concept while referring to the figures.

FIG. 1 is a schematic view illustrating a light scanning unit according to an embodiment of the present general inventive concept. In FIG. 1, the direction of the x-axis is a main scanning direction, a y-axis denotes a light beam deflection direction, and a z-axis direction is a sub scanning direction.

Referring to FIG. 1, the light scanning unit of the current embodiment includes a light source 1 to emit light, a deflector 4 configured to deflect a light beam emitted from the light source 1, and first and second scanning lenses 10 and 15 configured to image a light beam reflected from the deflector 4. Further, a mirror 8 may be provided to change the path of the light beam.

For example, the light source 1 may include a semiconductor laser diode.

A collimator lens 2 may be disposed on an optical path between the light source 1 and deflector 4. The collimator lens 2 collimates light emitted from the light source 1. A cylindrical lens 3 may be disposed on an optical path between the collimator lens 2 and the deflector 4. The cylindrical lens 3 may be an anamorphic lens having a predetermined power in only a sub-scanning direction (a z-axis direction). The light passing through the collimator lens 2 is condensed onto a deflection surface of the deflector 4 in the sub-scanning direction by the cylindrical lens 3. An aperture stop (not shown) may be additionally disposed between the collimator lens 2 and the cylindrical lens 3 to adjust a diameter of a light beam. The collimator lens 2 and the cylindrical lens 3 constitute an incident optical system of the light scanning unit.

For example, the deflector 4 is a polyhedral mirror having a plurality of deflection surfaces. In the example illustrated in FIG. 1, an octagonal mirror having eight deflection surfaces is used as the deflector 4. The deflector 4 is rotated by a driving motor at a constant speed. While the deflector 4 is rotated, a scanned surface of an object 9 such as a photoconductive drum is scanned with a light beam emitted from the light source 1 and deflected by the deflector. At this time, a direction in which a light beam deflected by the deflector 4 is changed as a result of the rotation of the deflector 4 is defined as a main scanning direction (an x-axis direction). For example, as the deflector 4 rotates in a counter-clockwise direction, a direction of the light beam deflected by the deflector 4 may change from direction a to direction b. Further, the main scanning direction may correspond to a length direction of the object 9.

A synchronization detection optical system may be provided to detect a part of a light beam deflected in the main scanning direction by the deflector 4. The synchronization detection optical system includes a synchronization detection lens 6 and a synchronization detection sensor 7. A synchronization detection mirror 5 may be disposed at a position close to a start or end point of a line (an optical path) traced by a light beam cast onto the object 9 so as not to interfere with the optical path of the light beam. For example, if the deflector rotates in a counter-clockwise direction, the start point of the optical path may align with the direction a and the end point of the optical path may align with the direction b. A light beam may be periodically incident on the synchronization detection sensor 7 as the deflector 4 is rotated, and the synchronization detection sensor 7 may sense the light beam to check synchronization of the light beam.

The first and second scanning lenses 10 and 15 constitute an imaging optical system configured to form an image on the object 9 based on image information by using a light beam deflected from the deflector 4 to the object 9. The first and second scanning lenses 10 and 15 may condense a light beam deflected from the deflector 4 onto the scanned surface of the object 9 to form an image. In addition, the first and second scanning lenses 10 and 15 may have an f-θ lens function so that scanning can be performed at a constant speed by a light beam deflected from the rotating deflector 4.

Figure 2:
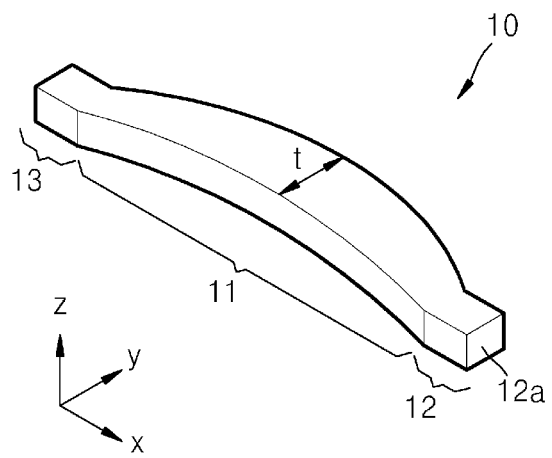
FIG. 2 is a schematic perspective view illustrating a scanning lens of the light scanning unit illustrated in FIG. 1.

FIG. 2 is a schematic view illustrating the first scanning lens 10. In FIG. 2, the direction of the x-axis is the main scanning direction, a y-axis denotes an optical axis, and a z-axis direction is the sub scanning direction.

Referring to FIG. 2, the first scanning lens 10 includes a lens portion 11 having effective optical surfaces, and flange portions 12 and 13 disposed at opposite sides of the lens portion 11. The lens portion 11 extends in the main scanning direction (x-axis direction) such that a light beam deflected from the deflector 4 is incident on only the lens portion 11 of the first scanning lens 10, and the effective optical surfaces are formed on front and rear sides of the lens portion 11 with predetermined curvatures. The flange portions 12 and 13 are coupled to lens holders (not shown) of a housing (not shown) of the light scanning unit so that the first scanning lens 10 can be fixed at one position. In a manufacturing process (described later), a gate of an injection molding tool (not shown) is connected to a gate-side end 12a of the flange portion 12. The flange portion 12 having the gate-side end 12a is referred to as a gate-side flange portion. The first scanning lens 10 may be formed of a plastic resin through an injection molding process (described later).

A thickness (t) of the lens portion 11 in the direction of the optical axis may be maximal at a center region of the lens portion 11 so that the lens portion 11 can have a convex shape. For example, the maximum thickness of the lens portion 11 may be greater than 6 mm. Generally, in the case of a part fabricated through an injection molding process, more birefringence may arise if the part has an elongated shape and is thick at its center. However, although the first scanning lens 10 has such a shape, the first scanning lens 10 may cause less birefringence by fabricating the first scanning lens 10 according to a fabricating method (described later) of an embodiment of the present general inventive concept.

Figure 3:
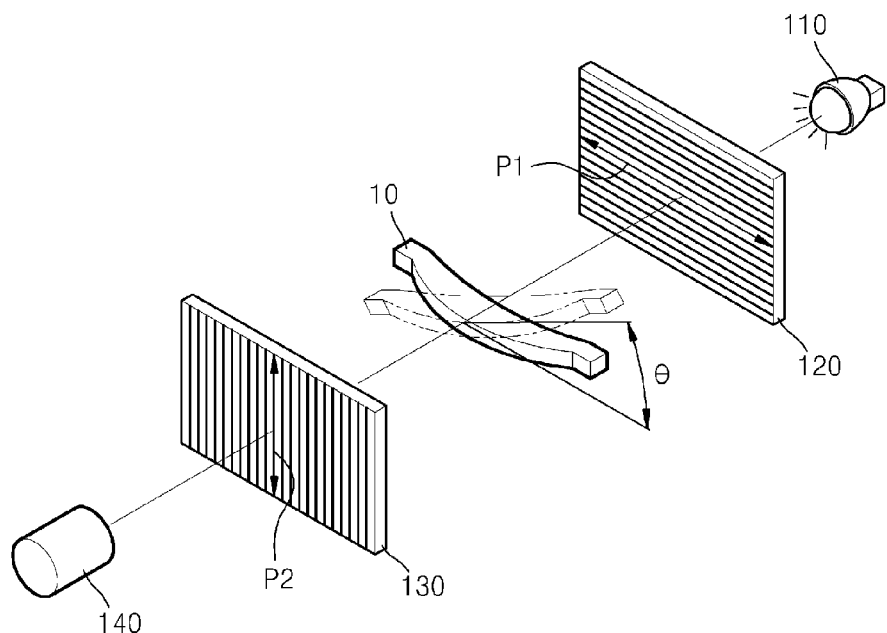
FIG. 3 is a view for explaining a method of inspecting birefringence characteristics of the scanning lens illustrated in FIG. 2.
Figure 4:
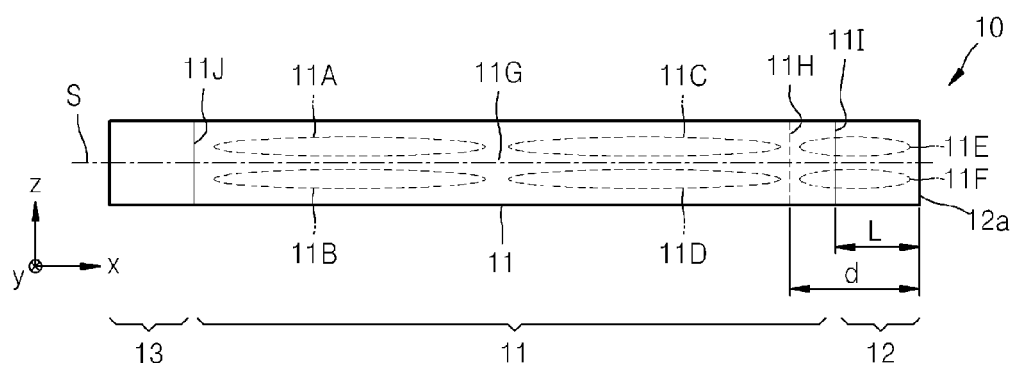
FIG. 4 is a view illustrating interference fringes measured according to the method of FIG. 3.

FIG. 3 is a view for explaining a method of inspecting birefringence characteristics of the first scanning lens 10, and FIG. 4 illustrates interference fringes of the first scanning lens 10 measured according to the method of FIG. 3.

Referring to FIG. 3, the first scanning lens 10 is disposed between two polarizers 120 and 130 configured to polarize light linearly in directions P1 and P2 that are perpendicular to each other when a light source 110 is turned on. Then, due to birefringence, interference fringes on an exit surface of the first scanning lens 10 may be observed through a camera 140. In particular, the light from the light source 110 reaches the first polarizer 120, polarizing the light in the first direction P1, and then the light polarized by the first polarizer 120 travels through the first scanning lens 10 to reach the second polarizer 130, which polarizes the light through the lens in the second direction P2. This set up with polarized light allows the camera 140 to effectively observe the interference fringes on an exit surface of the first scanning lens 10 as the interference fringes are formed due to the light from the light source 110.

Referring to FIG. 4, a plurality of interference fringes 11A, 11B, 11C, 11D, 11E, and 11F are located on the first scanning lens 10. A specific example of interference fringes will be explained later with reference to FIG. 10. The interference fringes 11A, 11B, 11C, 11D, 11E, and 11F may be formed on upper and lower sides of a sub-scanning centerline (S). The sub-scanning centerline (S) is a centerline perpendicular to the sub-scanning direction (z-axis direction) on a lens surface of the first scanning lens 10. The interference fringes 11A, 11B, 11C, and 11D (central interference fringes) are relatively long in the main scanning direction (x-axis direction) and are located on the effective optical surface of the first scanning lens 10 symmetrically about a center 11G of the lens portion 11. In FIG. 4, a boundary line of the effective optical surface of the lens portion 11 is denoted with a reference numeral 11H. The interference fringes 11E and 11F (peripheral interference fringes) are relatively short and are located on the gate-side flange portion 12. The peripheral interference fringes 11E and 11F are generated due to stress caused by refilling a resin in a manufacturing process (described later), particularly in a third packing operation (S40) (refer to FIGS. 5 and 7C). The peripheral interference fringes 11E and 11F continuously extend from the gate-side end 12a of the gate-side flange portion 12 and pass through a boundary 11I between the gate-side flange portion 12 and the lens portion 11. That is, a length (d) of the region including the peripheral interference fringes 11E and 11F is greater than a length (L) of the gate-side flange portion 12. Thus, the peripheral interference fringes 11E and 11F may be located in portions of both the gate-side flange portion 12 and the lens portion 11. The other flange portion 13 may not include any interference fringes, according to this example.

If the peripheral interference fringes 11E and 11F do not extend to the boundary 11H of the effective optical surface of the lens portion 11, an optical performance of the first scanning lens 10 may not be affected by birefringence (peripheral interference fringes 11E and 11F). In such case, a dark region (node) between the central interference fringes 11A, 11B, 11C, and 11D and the peripheral interference fringes 11E and 11F is observed to be on the boundary 11H of the effective optical surface. The effective optical surface of the lens portion 11 means a region of the lens portion 11 where a light beam is substantially refracted. In FIG. 4, the effective optical surface is located in the lens portion between the boundary 11H and the boundary 11J that is a boundary between the lens portion 11 and the other flange portion 13.

Figure 11:
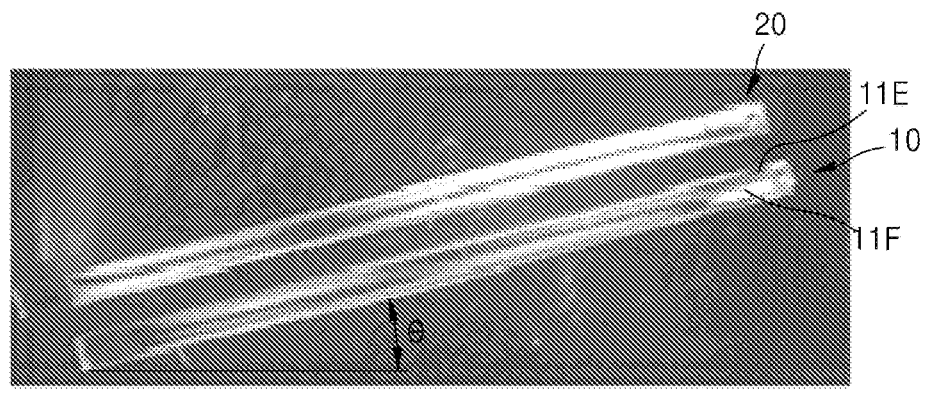
Figure 12:
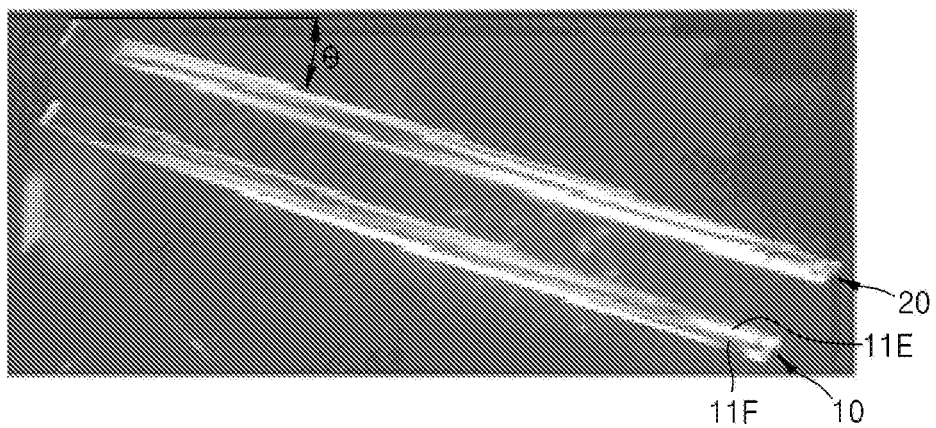

Referring again to FIG. 3, if the first scanning lens 10 is rotated counterclockwise with respect to the optical axis by a predetermined rotation angle θ, the peripheral interference fringe 11E located at the upper side of the sub-scanning centerline (S) of the first scanning lens 10 may be observed to be darkened. The rotation angle θ may be varied according to injection molding conditions in a manufacturing process of the first scanning lens 10. For example, the rotation angle θ may satisfy $0°<θ<45°$. Also, the peripheral interference fringe 11F located at the lower side of the sub-scanning centerline (S) may be observed to be darkened if the first scanning lens 10 is rotated clockwise with respect to the optical axis. That is, the peripheral interference fringes 11E and 11F are observed to be darkened depending on the directions of the rotation with respect to the optical axis. Thus, a rotation of the first scanning lens 10 in one direction causes darkening of one of the peripheral interference fringes 11E and 11F, and a rotation in the other direction causes darkening of the other one of the peripheral interference fringes 11E and 11F. Examples of darkness variations of the peripheral interference fringes 11E and 11F are shown in FIGS. 11 and 12 (described later).

In the above-described interference fringe pattern of the first scanning lens 10, the central interference fringes 11A, 11B, 11C, and 11D are on the effective optical surface of the lens portion 11, and the peripheral interference fringes 11E and 11F are intentionally formed to reduce a size of the central interference fringes 11A, 11B, 11C, and 11D, so as to minimize optical performance deterioration caused by birefringence.

In the above description of the current embodiment, the first scanning lens 10 has been described. However, the present general inventive concept is not limited thereto. For example, the second scanning lens 15 may have substantially the same interference fringe patterns as the first scanning lens 10 illustrated in FIG. 4. In addition, although the imaging optical system illustrated in FIG. 1 includes two scanning lenses 10 and 15 in the current embodiment, the present general inventive concept is not limited thereto. For example, the imaging optical system may include one lens or three or more lenses. In this case, one of the lenses may have such interference fringe pattern described above. In addition, one or more lenses of the incident optical system such as the collimator lens 2 or the cylindrical lens 3 may have such interference fringe pattern described above.

Figure 5:
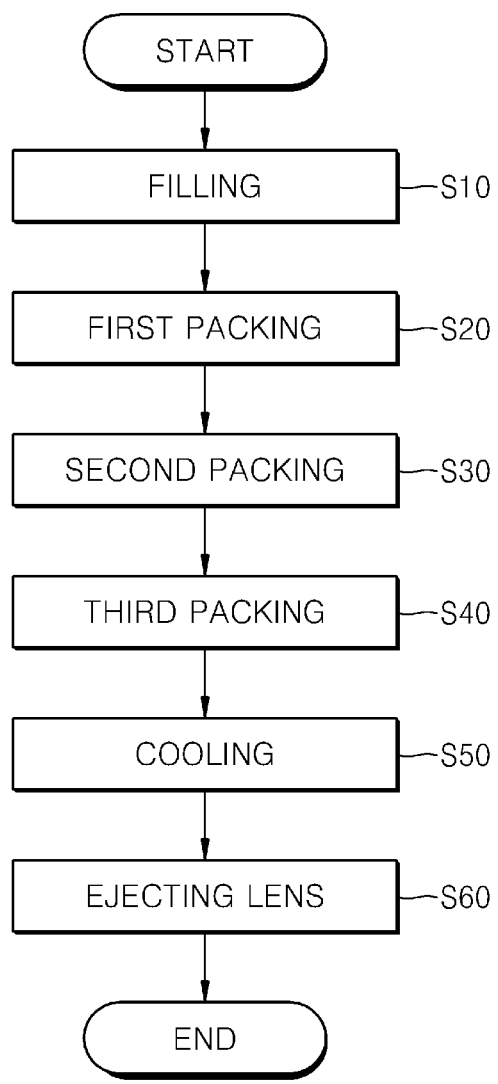
FIG. 5 is a view for explaining a method of fabricating a lens according to an embodiment of the present general inventive concept.
Figure 6:
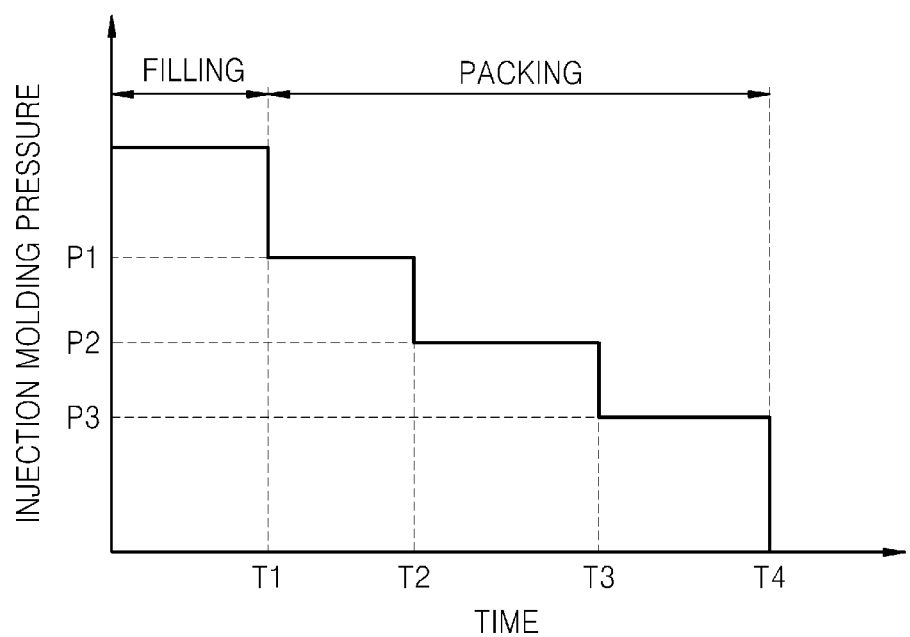
FIG. 6 is a graph illustrating an exemplary holding pressure profile in packing operations of the fabricating method explained with reference to FIG. 5.
Figure 7A:
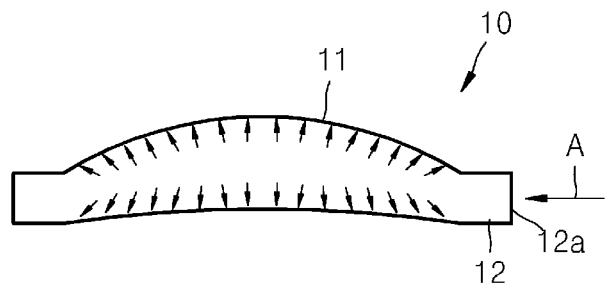
FIGS. 7A through 7C are views illustrating flow of a resin and stress distribution during the packing operations of the fabricating method of FIG. 5.
Figure 7B:
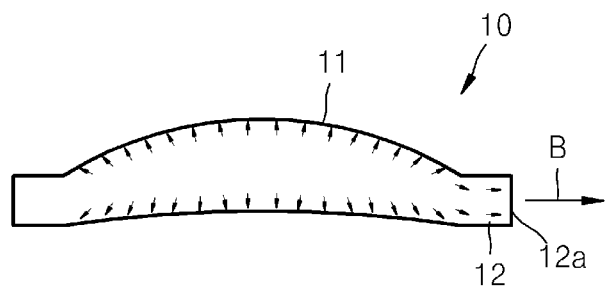
Figure 7C:
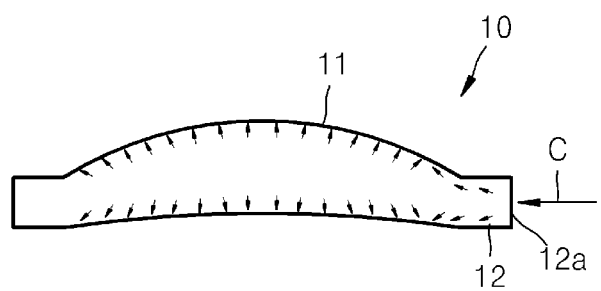

FIG. 5 is a view for explaining a method of fabricating a lens according to an embodiment of the present general inventive concept, and FIG. 6 illustrates an exemplary holding pressure profile in packing operations. FIGS. 7A through 7C illustrate resin flows in the packing operations.

Referring to FIG. 5, a melted plastic resin is filled into a cavity of an injection mold in operation S10, and the first to third packing operations S20, S30, and S40 are performed. Thereafter, a cooling operation S50 is performed, and then, in operation S60, a lens is ejected from the injection mold. The operations except for the first to third packing operations S20, S30, and S40 are substantially the same as general injection molding operations. Thus, the first to third packing operations S20, S30, and S40 will be mainly described below.

After the injection mold is completely filled with the plastic resin in operation S10, the first to third packing operations S20, S30, and S40 are performed. In the current embodiment, packing is performed through three operations.

Referring to FIGS. 5 and 6, in the first packing operation S20, supply of the plastic resin to the cavity is continued at a predetermined holding pressure P1. The plastic resin is continuously supplied to the cavity in operation S20, because after the filling operation 310, the plastic resin shrinks in the cavity as the resin cools, thereby creating space in the cavity unfilled with the plastic resin. If the plastic resin (melted state) is injected into the cavity of the injection mold at a predetermined injection pressure, a frictional force is applied to the plastic resin due to a flow resistance in the cavity. Therefore, in the first packing operation S20, the holding pressure P1 is set to a sufficiently large value to overcome the frictional force. The holding pressure P1 may be varied in a stepped manner as long as the plastic resin can be injected into the cavity (see, e.g., FIG. 6). The first packing operation S20 is performed from a time T1 at which the filling operation S10 ends to a time T2 at which a surface of the plastic resin is solidified to form, for example, the lens portion 11 of the first scanning lens 10.

FIG. 7A illustrates flow of the resin in the first packing operation 320. In FIG. 7A, an arrow (A) denotes continuous supply of the resin into the cavity, and remaining arrows in the lens portion 11 denote the flow of the resin, which has a relatively high viscosity due to solidification of the resin.

In general, birefringence is caused by stress applied to a resin during an injection molding process. For example, the stress may include flow-induced stress and thermally-induced stress. The flow-induced stress, which has a relatively large influence on spot size deterioration, is caused mainly by flow in a relatively high viscosity state. In an injection molding process, a viscosity of a resin increases as the resin is cooled (and thus becomes solidified), and a relaxation time of flow-induced stress increases exponentially as the resin is cooled. Thus, residual stress remains. Such residual stress causes birefringence. Therefore, if the cooling operation S50 is performed immediately after the first packing operation S20, birefringence is caused across the entire region of the lens portion 11 of the first scanning lens 10 by the high-viscosity flow of resin denoted by the numerous small arrows in FIG. 7A.

Therefore, in the fabricating method of the current embodiment, to minimize stress generated in the first packing operation S20, the second packing operation S30 is performed at a reduced holding pressure so that a part of the resin can be discharged from the cavity through a gate (of the injection mold) at the gate-side flange portion 12 before solidification. A holding pressure P2 of the second packing operation S30 is set to such value that a force resulting from the holding pressure P2 may be smaller than the frictional force applied to the resin. The second packing operation S30 is performed from the time T2 where the surface of the resin forming the lens portion 11 is solidified until a time T3 where refilling is performed due to shrinkage of the resin.

FIG. 7B illustrates flow of the resin in the second packing operation S30.

In FIG. 7B, an arrow (B) denotes backflow of the resin out of the cavity through the gate of the injection mold, and remaining arrows in the lens portion 11 denote the flow of the resin, which has a relatively high viscosity due to solidification of the resin. In the second packing operation S30, the resin is allowed to flow backward. Thus, in order for the resin to flow back out through the gate of the inject mold at the gate-side end 12a of the gate-side flange portion 12, the pressure on the solidifying resin is largely reduced.

Due to the backflow of the resin before the gate is sealed, the resin is not pressed against the cavity and thus the resin is able to shrink as it cools. Thus in the third packing operation S40, the resin is supplied into the cavity again to compensate for the shrinkage of the resin in the cavity. In FIG. 6, a holding pressure P3 of the third packing operation S40 is lower than the holding pressure P2 of the second packing operation S30. However, unlike the example shown in FIG. 6, the holding pressure P3 may instead be equal to or greater than the holding pressure P2.

FIG. 7C illustrates flow of the resin in the third packing operation 340. In FIG. 7C, an arrow (C) denotes refilling the resin through the gate of the injection mold, and remaining arrows in the lens portion 11 denote the flow of the resin, which has a relatively high viscosity due to solidification.

Since the cavity is refilled with the resin through the gate in the third packing operation S40, stress is applied to a region around the gate-side flange portion 12. Due to the stress, birefringence is caused after the resin is solidified. Thus, interference fringes, such as those observed by using the polarizers 120 and 130 in FIG. 3, may be observed. In the fabricating method of the current embodiment, injection molding conditions are adjusted such that interference fringes generated due to stress in the third packing operation S40 may not extend to the boundary 11H (see FIG. 4) of the first scanning lens 10. For example, the time T2 or T3 or the holding pressure P2 or P3 of the second or third packing operation S30 or S40 may be adjusted. The third packing operation S40 is performed until the resin solidifies at the gate (time T4). That is, the third packing operation S40 is performed until the gate is sealed with the resin.

As shown in FIGS. 7A through 7C, in the first to third packing operations S20, S30, and S40, since the flow direction of the resin varies at the gate-side flange portion 12, the peripheral interference fringes 11E and 11F (see FIG. 4) are caused. In addition, because the directions of stress are symmetric with respect to the sub-scanning centerline (S) of FIG. 4, the peripheral interference fringes 11E and 11F at the upper and lower sides of the sub-scanning centerline (S) are sequentially observed to be darkened according to variation of the rotation angle θ of the first scanning lens 10 (this will be explained with reference to FIGS. 11 and 12). Therefore, flow of the resin at the gate can be estimated based on the position of the dark region between the central interference fringes 11A, 11B, 11C, and 11D (see FIG. 4) and the peripheral interference fringes 11E and 11F, or the darkness variations of the peripheral interference fringes 11E and 11F. Thus, injection mold conditions can be determined based on estimated flow of a resin.

Next, optical characteristics of a lens fabricated according to the above-described fabricating method will be explained. Table 1 below shows exemplary injection molding conditions.

TABLE 1

|  | Comparative Example | Embodiment |
| --- | --- | --- |
| First holding pressure (Mpa) | 120 | 120 |
| First packing time (sec) | 30 | 10 |
| Second holding pressure (Mpa) | 80 | 70 |
| Second packing time (sec) | 30 | 15 |
| Third holding pressure (Mpa) | 40 | 40 |
| Third packing time (sec) | 30 | 65 |
| Cycle time (sec) | 220 | 220 |

Referring to Table 1, each of the comparative example and the embodiment includes three packing operations. However, in the comparative example, the three packing operations are each formed for the same amount of time, and holding pressures thereof are sequentially reduced from the first packing operation to the third packing operation. In addition, in the packing operations of the comparative example, a resin is injected into a cavity of an injection mold. On the other hand, in the embodiment, just after a surface of a resin starts to solidify in a cavity in a first packing operation, a second packing operation is performed to allow backflow of the resin out of the cavity.

Figure 8A:
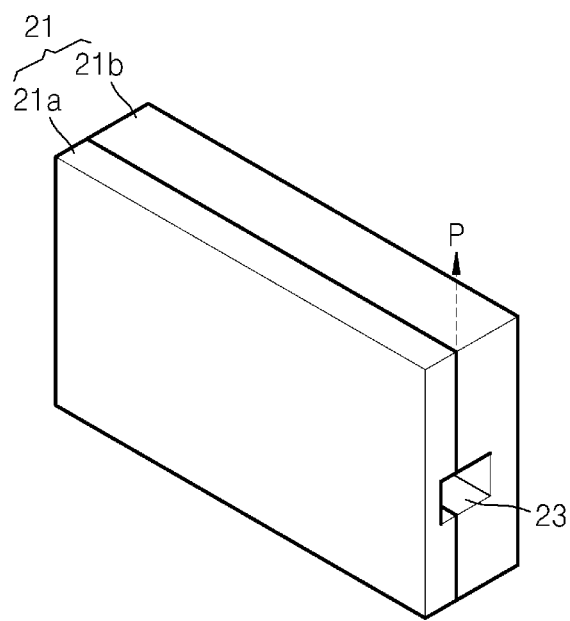
FIGS. 8A-8C illustrate various views of an exemplary embodiment of the injection mold for the method of fabricating the lens according to an embodiment of the present general inventive concept.
Figure 8B:
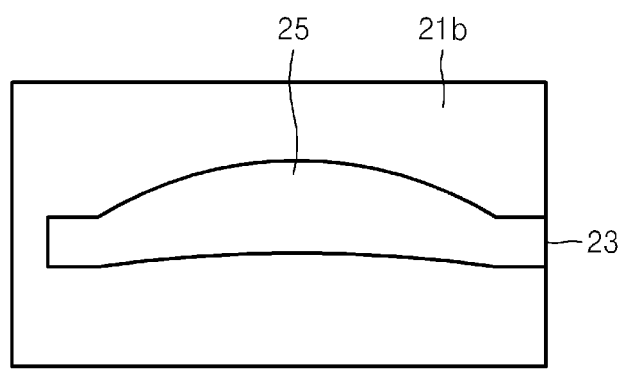
Figure 8C:
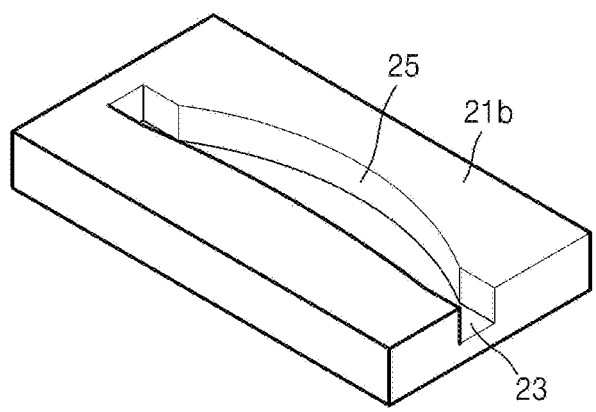

FIGS. 8A-8C illustrate various views of an exemplary embodiment of the injection mold for the method of fabricating the lens according to an embodiment of the present general inventive concept.

FIG. 8A illustrates a view of the injection mold for the lens having a gate to inject the resin into a cavity of the injection mold. The injection mold 21 in FIG. 8A may be separated into a first part 21a and a second part 21b at a point P. For example, the resin may be injected via the gate 23 of the injection mold 21, and when the resin solidifies, the first part 21a and the second part 21b may be separated at the point P to release the solidified resin, which results in the lens. FIGS. 8B and 8C illustrate a cross-section view and a plan view of the second part 21b of the injection mold 21. As illustrated in FIGS. 8B and 8C, the injection mold 21 has a cavity 25 shaped like the lens, such that when the resin is injected through the gate 23, the cavity 25 is filled with the resin to form a lens.

Figure 9A:
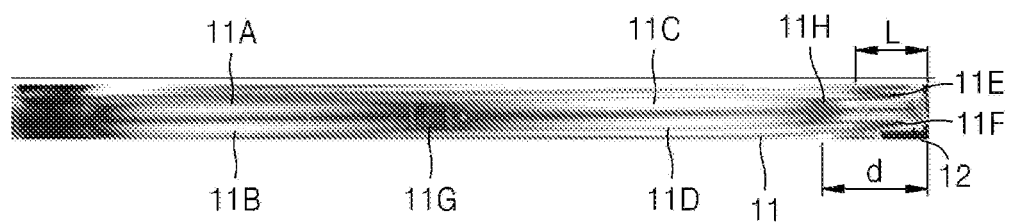
FIG. 9A is an interference fringe image of a scanning lens fabricated according to the method of FIG. 5.
Figure 9B:
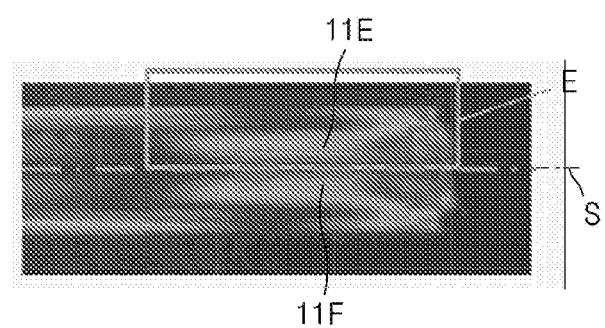
FIG. 9B is an enlarged view of the interference fringe image of FIG. 9A to show interference fringes at a gate-side flange portion.

FIG. 9A is an interference fringe image of the first scanning lens 10 fabricated under the conditions of the embodiment shown in Table 1, and FIG. 9B is an enlarged view of the interference fringe image of FIG. 9A to show interference fringes at a gate-side flange portion. The images of FIGS. 9A and 9B can be captured according to the method explained with reference to FIG. 3. Referring to a region E of FIG. 9B located above the sub-scanning centerline (S), the interference fringe 11E is bright. A bright region means occurrence of birefringence. Referring again to FIGS. 9A and 9B, substantially the same interference fringe pattern as that explained with reference to FIG. 4 can be observed on the first scanning lens 10 fabricated under the injection molding conditions of the embodiment shown in Table 1.

Figure 10:
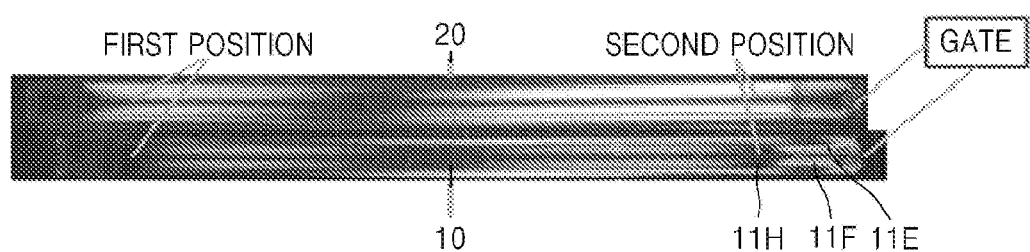
FIGS. 10 through 12 are interference fringe images of a scanning lens fabricated according to the method of FIG. 5 and a scanning lens of a comparative example rotated by 0°, θ, and −θ.

FIGS. 10 through 12 are interference fringe images of the first scanning lens 10 fabricated under the conditions of the embodiment shown in Table 1 and a scanning lens 20 fabricated under the conditions of the comparative example shown in Table 1 rotated by 0° (FIG. 10), θ (FIG. 11), and −θ (FIG. 12).

FIG. 10 illustrates observation of the first scanning lens 10 of the embodiment and the second scanning lens 20 of the comparative example that are rotated by 0°. Referring to FIG. 10, the first scanning lens 10 of the embodiment has interference fringes that are darker than interference fringes of the scanning lens 20 of the comparative example. This means that birefringence of the first scanning lens 10 is lower than that of the scanning lens 20. Particularly, interference fringes are not observed at portions of first and second positions that are close to ends of the first scanning lens 10 although bright interference fringes are observed at portions of first and second positions close to ends of the scanning lens 20. In addition, the first scanning lens 10 has the peripheral interference fringes 11E and 11F but the scanning lens 20 does not have peripheral interference fringes.

FIG. 11 illustrates observation of the first scanning lens 10 of the embodiment and the second scanning lens 20 of the comparative example that are rotated by θ° (θ° counterclockwise rotation). Referring to FIG. 11, when the first scanning lens 10 of the embodiment is rotated counterclockwise by a rotation angle θ, the peripheral interference fringe 11E located above the sub-scanning centerline (S) is darkened, and the peripheral interference fringe 11F located below the sub-scanning centerline (S) is brightened. On the other hand, in the case of the scanning lens 20 of the comparative example, a region corresponding to the peripheral interference fringes 11E and 11F is varied in a manner opposite to the variation of the peripheral interference fringes 11E and 11F of the first scanning lens 10 of the embodiment. That is, a portion of the scanning lens 20 near the gate and above the sub-scanning centerline (S) is brightened and a portion of the scanning lens 20 near the gate and below the sub-scanning centerline (S) is darkened. The rotation angle θ may satisfy 0°<θ<45°. For example, the rotation angle θ is about 15° in the case shown in FIG. 11.

FIG. 12 illustrates observation of the first scanning lens 10 of the embodiment and the second scanning lens 20 of the comparative example that are rotated by −θ° (θ° clockwise rotation). Referring to FIG. 12, when the first scanning lens 10 of the embodiment is rotated clockwise by a rotation angle θ, the peripheral interference fringe 11E located above the sub-scanning centerline (S) is brightened, and the peripheral interference fringe 11F located below the sub-scanning centerline (S) is darkened. On the other hand, in the case of the scanning lens 20 of the comparative example, the dark region corresponding to the peripheral interference fringes 11E and 11F is varied in a manner opposite to the variation of the peripheral interference fringes 11E and 11F of the first scanning lens 10 of the embodiment. That is, a portion of the scanning lens 20 near the gate and above the sub-scanning centerline (S) is darkened and a portion of the scanning lens 20 near the gate and below the sub-scanning centerline (S) is brightened.

Next, optical characteristics of a light scanning unit according to an embodiment of the present general inventive concept will be explained.

Table 2 below shows spot sizes of a light scanning unit including the first scanning lens 10 fabricated under the conditions of the embodiment shown in Table 1, and spot sizes of a light scanning unit including the scanning lens 20 fabricated under the conditions of the comparative example shown in Table 1.

TABLE 2

| Main scanning coordinate | Comparative example | | Embodiment | |
| --- | --- | --- | --- | --- |
| (mm) | main | sub | main | sub |
| −100 (gate direction) | 65 | 83 | 64 | 68 |
| −80 | 64 | 77 | 65 | 68 |
| −60 | 64 | 72 | 65 | 68 |
| −40 | 65 | 70 | 65 | 69 |
| −20 | 64 | 69 | 63 | 68 |
| 0 | 65 | 69 | 64 | 68 |
| 20 | 63 | 69 | 63 | 69 |
| 40 | 64 | 68 | 64 | 68 |
| 60 | 64 | 70 | 64 | 68 |
| 80 | 64 | 70 | 64 | 68 |
| 100 | 64 | 71 | 63 | 69 |

In Table 2, the spot sizes are given in micrometers (μm). Referring to Table 2, the spot sizes of the light scanning unit of the embodiment are uniform both in the main scanning direction and the sub-scanning direction (particularly in the sub-scanning direction) as compared with the spot sizes of the light scanning unit of the comparative example. That is, birefringence is reduced on the effective optical surface of the first scanning lens 10.

In the related art, an injection molding method such as an injection-compression molding method, a gate seal method, a remelt method, and a slow-cooling method have been proposed to reduce birefringence. However, such methods require expensive dedicated equipment, and thus manufacturing costs increase. However, according to the fabricating method of the embodiment, birefringence can be effectively reduced by varying a holding pressure profile of a conventional injection molding process.

Figure 13:
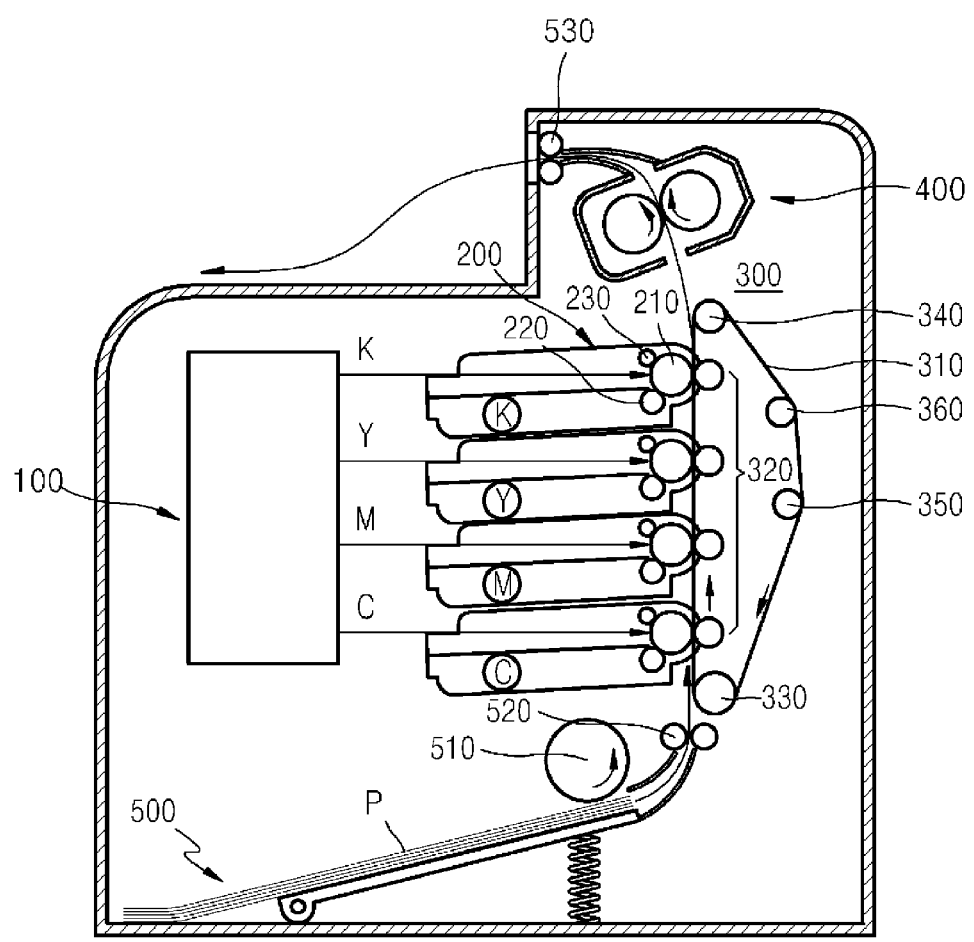
FIG. 13 is a view illustrating an exemplary electrophotographic image forming apparatus according to an embodiment of the present general inventive concept.

FIG. 13 is a view illustrating an image forming apparatus including the light scanning unit of the embodiment.

The image forming apparatus shown in FIG. 13 is a dry electrophotographic image forming apparatus configured to print color images using a dry developer (hereinafter referred to as toner)

The image forming apparatus includes a light scanning unit 100, developing units 200, a transfer unit 300, and a fusing unit 400.

The light scanning unit 100 may include the light scanning unit of the above-described embodiment. For color printing, the light scanning unit 100 may emit a plurality of light beams, and the developing units 200 may be provided according to colors corresponding to the light beams. In this case, the light scanning unit 100 may include a plurality of light scanning units as described with reference to FIG. 1 or may deflect a plurality of light beams using one deflector (refer to the deflector 4 of FIG. 1). For example, the light scanning unit 100 may emit four light beams corresponding to black (K), magenta (M), yellow (Y), and cyan (C), and black (K), magenta (M), yellow (Y), and cyan (C) developing units 200 may be provided.

Each of the developing units 200 includes a photoconductive drum 210 as an image receiver on which an electrostatic latent image is formed, and a developer roller 220 used to develop the electrostatic latent image.

The photoconductive drum 210 is an example of a photoconductor formed by coating a cylindrical metal pipe with a photoconductive layer having a predetermined thickness. Alternatively, a photoconductive belt (not shown) may be used as a photoconductor. An outer surface of the photoconductive drum 210 is exposed to a light beam. A charge roller 230 is disposed at the outer surface of the photoconductive drum 210 at a position prior to a position exposed to a light beam of the light scanning unit 100. The charge roller 230 is an example of a charger. The charge roller 230 is rotated in contact with the photoconductive drum 210 to charge the surface of the photoconductive drum 210 to a uniform potential. A charge bias voltage is applied to the charge roller 230. A corona charger (not shown) may be used instead of the charge roller 230.

Toner is attached to the outer surface of the developer roller 220, and the toner is supplied from the developer roller 220 to the photoconductive drum 210. A developing bias voltage is applied to the developer roller 220 so that toner can be supplied from the developer roller 220 to the photoconductive drum 210. Each of the developing units 200 may further include a supply roller (not shown) configured to attach toner to the developer roller 220, a regulator (not shown) configured to regulate the amount of toner attached on the developer roller 220, and an agitator (not shown) configured to move toner toward the supply roller and/or the developer roller 220.

The transfer unit 300 may include a paper carrying belt 310 and four transfer rollers 320. The paper carrying belt 310 faces exposed portions of the outer surfaces of the developing units 200. The paper carrying belt 310 is supported by a plurality of support rollers 330, 340, 350, and 360 and is rotated on the support rollers 330, 340, 350, and 360. The four transfer rollers 320 are disposed at positions facing the photoconductive drums 210 of the developing units 200 with the paper carrying belt 310 disposed therebetween. A transfer bias voltage is applied to the transfer rollers 320.

An operation of the image forming apparatus will now be described.

The photoconductive drums 210 of the developing units 200 are charged to a uniform potential by a developing bias voltage applied to the charge rollers 230. The light scanning unit 100 casts four light beams corresponding to cyan, magenta, yellow, and black color image information toward the photoconductive drums 210 of the developing units 200 to form electrostatic latent images on the photoconductive drums 210. A developing bias voltage is applied to the developer rollers 220. Then, toner attached to the outer surfaces of the developer rollers 220 is attached to the electrostatic latent images of the photoconductive drums 210. In this way, cyan, magenta, yellow, and black toner images are formed on the photoconductive drums 210 of the developing units 200, respectively.

A medium such as paper (P) on which the toner images will be finally attached is picked up from a cassette 500 by a pick-up roller 510. The paper (P) is moved onto the paper carrying belt 310 through feed rollers 520. The paper (P) is attached to the paper carrying belt 310 by an electrostatic force so that the paper (P) can be carried at the same velocity as a linear velocity of the paper carrying belt 310.

For example, when a leading edge of the cyan toner image formed on one of the photoconductive drums 210 of the developing units 200 is moved to a nip point between the photoconductive drum 210 and the transfer roller 320, a leading edge of the paper (P) is also moved to the nip point. A transfer bias voltage is applied to the transfer rollers 320, and the toner images formed on the photoconductive drums 210 are transferred to the paper (P) as the paper (P) moves between the transfer rollers 320 and the photoconductive drums 210. Specifically, as the paper (P) is carried, the cyan, magenta, yellow, and black toner images are sequentially transferred to the paper (P) in a superimposing manner so that a color toner image can be formed on the paper (P).

The color toner image transferred on the paper (P) is not detached from the paper (P) due to an electrostatic force. The fusing unit 400 fuses the color toner image on the paper (P) by applying heat and pressure. Then, the paper (P) is discharged out of the image forming apparatus by output rollers 530.

While the lens, the method of fabricating the lens, and the light scanning unit of the present general inventive concept have been particularly shown and described with reference to exemplary embodiments thereof, it will be understood by those of ordinary skill in the art that various changes in form and details may be made therein without departing from the spirit and scope of the present inventive concept as defined by the following claims and their equivalents.

What is claimed is:

1. A lens comprising:
   a lens portion comprising an effective optical surface;
   a gate-side flange portion between the lens portion and a gate-side end of the lens; and
   a second flange portion between the lens portion and a second end of the lens,
   wherein the lens has a structure so that a degree of birefringence at the gate-side flange portion is greater than a degree of birefringence at the second flange portion, and to generate interference fringes on the lens if the lens is disposed between two polarizers configured to polarize light linearly in perpendicular directions and is illuminated in an optical axis direction, and peripheral interference fringes of the interference fringes extend continuously from the gate-side end and are longer than the gate-side flange portion.

2. The lens of claim 1, wherein the lens extends in a main scanning direction such that a light beam deflected by a deflector in the main scanning direction is imaged on a scanned surface through the lens.

3. The lens of claim 2, wherein when the lens disposed between the two polarizers is rotated with respect to an optical axis by a rotation angle θ, one of the peripheral interference fringes located above a sub-scanning centerline is darkened for the rotation angle θ in a range of 0°<θ<45°.

4. The lens of claim 3, wherein darkening of the peripheral interference fringe located above the sub-scanning centerline and darkening of one of the peripheral interference fringes located below the sub-scanning centerline are varied according to rotation of the lens in different rotation directions with respect to the optical axis.

5. The lens of claim 1, wherein the peripheral interference fringes extending continuously from the gate-side end do not reach the effective optical surface of the lens portion.

6. The lens of claim 1, wherein a thickness of the lens portion in the optical axis direction is maximal at a center part of the lens portion.

7. The lens of claim 1, wherein a maximal thickness of the lens portion in the optical axis direction is greater than 6 mm.

8. The lens of claim 1, wherein the lens is formed of a plastic resin.

9. A light scanning unit comprising:
a light source configured to emit a light beam;
a deflector configured to deflect the light beam emitted from the light source in a main scanning direction; and
a least one lens disposed between the light source and the deflector or between the deflector and a scanned surface,
wherein the lens comprises:
a lens portion comprising an effective optical surface;
a gate-side flange portion between the lens portion and a gate-side end of the lens; and
a second flange portion between the lens portion and a second end of the lens,
wherein the lens has a structure so that a degree of birefringence at the gate-side flange portion is greater than a degree of birefringence at the second flange portion, and to generate interference fringes if the lens is disposed between two polarizers configured to polarize light linearly in perpendicular directions and is illuminated in an optical axis direction, and peripheral interference fringes of the interference fringes extend continuously from the gate-side end and are longer than the gate-side flange portion.

10. The light scanning unit of claim 9, wherein the lens extends in the main scanning direction such that the light beam deflected by the deflector in the main scanning direction is imaged on the scanned surface through the lens.

11. The light scanning unit claim 10, wherein when the lens disposed between the two polarizers is rotated with respect to an optical axis by a rotation angle θ, one of the peripheral interference fringes located above a sub-scanning centerline is darkened for the rotation angle θ in a range of 0°<θ<45°.

12. The light scanning unit of claim 11, wherein darkening of the peripheral interference fringe located above the sub-scanning centerline and darkening of one of the peripheral interference fringes located below the sub-scanning centerline are varied according to rotation of the lens in different rotation directions with respect to the optical axis.

13. The light scanning unit of claim 9, wherein the peripheral interference fringes extending continuously from the gate-side end do not reach the effective optical surface of the lens portion.

14. The light scanning unit of claim 9, wherein a thickness of the lens portion in the optical axis direction is maximal at a center part of the lens portion.

15. The light scanning unit of claim 9, wherein a maximal thickness of the lens portion in the optical axis direction is greater than 6 mm.

16. The light scanning unit of claim 9, wherein the lens is formed of a plastic resin.

17. An image forming apparatus comprising:
a light scanning unit comprising:
a light source configured to emit a light beam,
a deflector configured to deflect the light beam emitted from the light source in a main scanning direction, and
a least one lens disposed between the light source and the deflector or between the deflector and a scanned surface;
a developing unit comprising:
a photoconductor disposed at a position on which the light beam emitted from the light scanning unit is imaged so that an electrostatic latent image is formed on the photoconductor, and
a developer roller configured to develop the electrostatic latent image; and
a transfer unit to which the image developed by the developing unit is transferred, wherein the lens comprises:
a lens portion comprising an effective optical surface;
a gate-side flange portion between the lens portion and a gate-side end of the lens;
a second flange portion between the lens portion and a second end of the lens,
wherein the lens has a structure so that a degree of birefringence at the gate-side flange portion is greater than a degree of birefringence at the second flange portion, and to generate interference fringes if the lens is disposed between two polarizers configured to polarize light linearly in perpendicular directions and is illuminated in an optical axis direction, and peripheral interference fringes of the interference fringes extend continuously from the gate-side end and are longer than the gate-side flange portion.

18. An image forming apparatus, comprising:
a light source to emit light;
a photoconductor onto which the light from the light source is scanned; and
a lens between the light source and the photoconductor, the lens having a lens portion to direct the light from the light source onto the photoconductor and a first flange portion at a first side of the lens portion and a second flange portion at a second side of the lens portion,
wherein the lens has a structure so that a degree of birefringence at the first flange portion is greater than a degree of birefringence at the second flange portion, and to generate interference fringes within the lens portion and peripheral interference fringes in the flange portion extending into the lens portion when the lens is illuminated in an optical axis direction by a polarized light.

19. A lens comprising:
a lens portion;
a first flange portion extending from a first edge of the lens portion; and
a second flange portion extending from a second edge of the lens portion, the lens formed so that a degree of birefringence at the first flange portion is greater than a degree of birefringence at the second flange portion, and to generate interference fringes thereon when light from a light source is polarized in a first direction before traversing through the lens and thereafter is polarized in a second direction perpendicular to the first direction, such that peripheral interference fringes generated on the flange portion extend from the flange portion into the lens portion and are longer in length than the flange portion.

* * * * *